United States Patent [19]

Kinjo

[11] Patent Number: 5,289,227
[45] Date of Patent: Feb. 22, 1994

[54] METHOD OF AUTOMATICALLY CONTROLLING TAKING EXPOSURE AND FOCUSING IN A CAMERA AND A METHOD OF CONTROLLING PRINTING EXPOSURE

[75] Inventor: Naoto Kinjo, Kanagawa, Japan

[73] Assignee: Fuji Photo Film Co., Ltd., Kanagawa, Japan

[21] Appl. No.: 7,961

[22] Filed: Jan. 22, 1993

[30] Foreign Application Priority Data

| Jan. 22, 1992 | [JP] | Japan | 4-009531 |
| Jan. 22, 1992 | [JP] | Japan | 4-009533 |
| Jan. 27, 1992 | [JP] | Japan | 4-012122 |

[51] Int. Cl.⁵ .......................... G03B 13/36
[52] U.S. Cl. .................. 354/402; 354/403; 354/105; 355/77
[58] Field of Search ........... 354/400, 402, 403, 406, 354/407, 408, 412, 430, 105, 106, 107, 108, 109; 355/38, 68, 41, 77

[56] References Cited

U.S. PATENT DOCUMENTS

| 3,782,947 | 1/1974 | Krall . | |
| 4,279,945 | 7/1981 | Audran et al. . | |
| 4,302,523 | 11/1981 | Audran et al. . | |
| 4,929,971 | 5/1990 | Imura et al. | 354/106 |
| 4,943,824 | 7/1990 | Nabeshima et al. | 354/400 |
| 5,006,700 | 4/1991 | Kosaka et al. | 354/403 |
| 5,016,039 | 5/1991 | Sosa et al. | 354/105 |
| 5,128,711 | 7/1992 | Terashita et al. | 354/106 |
| 5,148,211 | 9/1992 | Kotani et al. | 354/403 |
| 5,189,462 | 2/1993 | Nakajima | 354/403 |
| 5,227,837 | 7/1993 | Terashita | 354/109 |

Primary Examiner—Russell E. Adams
Attorney, Agent, or Firm—Sughrue, Mion, Zinn, Macpeak & Seas

[57] ABSTRACT

A scene to be photographed is divided into a plurality of scene divisional areas disposed in a matrix pattern. A plurality of distance measuring points are two-dimensionally disposed in correspondence with the scene divisional areas. A change with time in distance data is detected at each distance measuring point. A distance measuring point having a change greater than a threshold value is extracted as a main object candidate point. Of the main object candidates points, the distance measuring point having the shortest distance data falling within a predetermined range from the shortest distance data are judged as the effective distance measuring points where a main object is present. The focus of a taking lens is adjusted in accordance with the distance data of the effective distance measuring points. The taking exposure amount is controlled in accordance with an average value of brightness data of effective scene divisional measuring points. In a preferred embodiment, position information and divisional photometry information are recorded on a photographic film during photography. A photographic printer then measures the density of a plurality of frame divisional areas corresponding to the scene divisional areas. In accordance with the measured density and the brightness and exposure amount recorded on a photographic film, a shift of the taking exposure amount from an ideal characteristic is obtained. An ideal and elementary printing exposure amount is corrected by using the shift amount to determine a final elementary printing exposure amount.

24 Claims, 12 Drawing Sheets

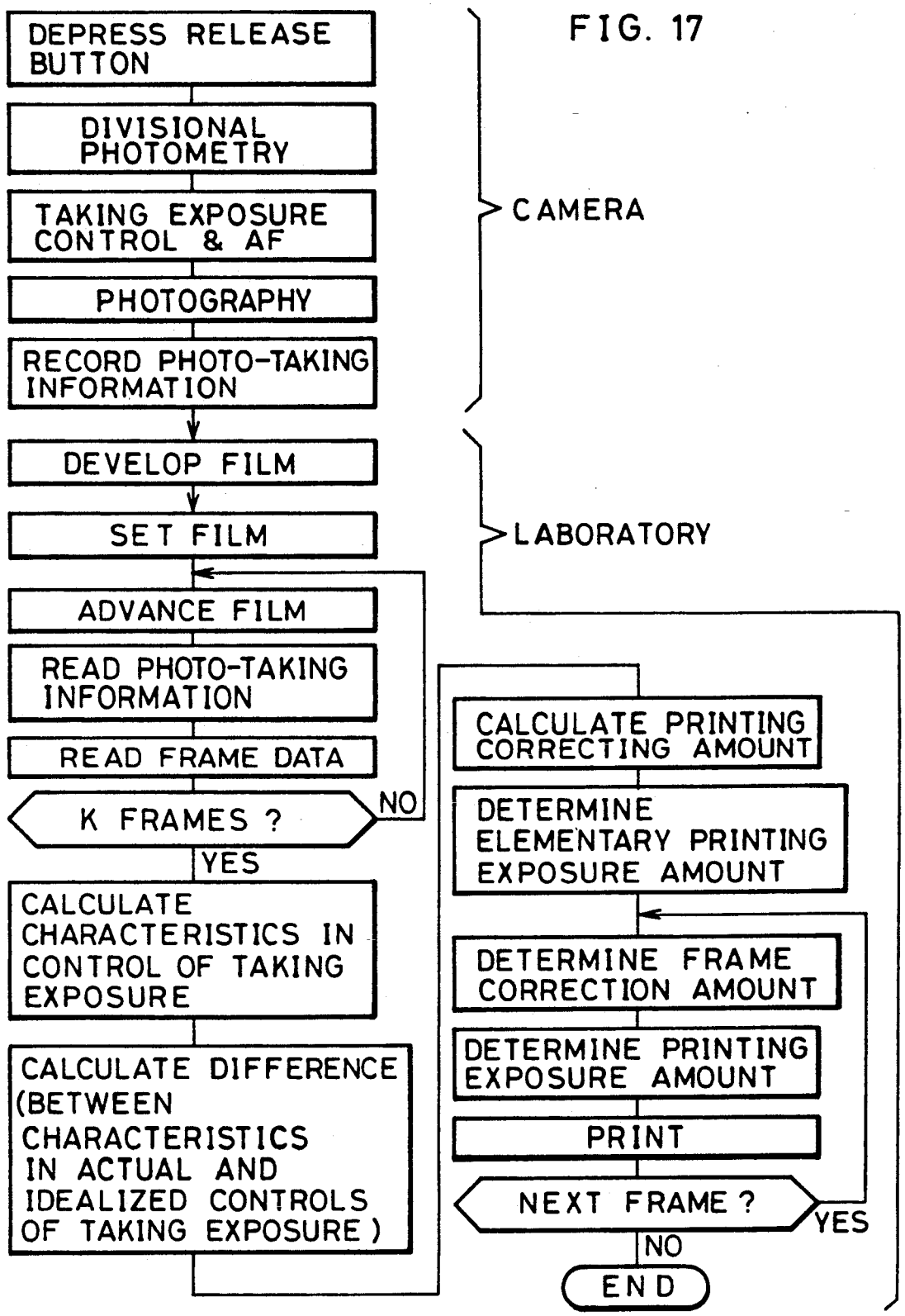

METHOD OF AUTOMATICALLY CONTROLLING TAKING EXPOSURE AND FOCUSING IN A CAMERA AND A METHOD OF CONTROLLING PRINTING EXPOSURE

BACKGROUND OF THE INVENTION

1. Field of the Invention

The present invention relates to a method of automatically controlling photographic exposure and focussing based upon a main object, a camera realizing this method, and a photographic printing method. More particularly, the invention relates to a method of automatically detecting a main object within a scene to be taken, and determining a taking exposure amount and main object distance in accordance with the detected main object, and a camera realizing this method. The invention further relates to a method of producing a photographic print having a proper density of the image of a main object, by using a photographic film taken on the basis of photo-taking information of the main object.

2. Description of the Related Art

Conventional automatic focussing cameras are of a one-point distance measuring type and a multi-point distance measuring type. For the former type, one measuring point is set at the center of a scene to be taken, and this one measuring point is represented by a target mark within a viewfinder. Framing of the camera is determined so that part of a main object selected as desired among various objects in a scene is set within the target mark of the viewfinder at the center of the viewfinder. After this framing, the release button is half depressed to measure the distance to the main object within the target mark. Upon full depression of the release button, the focus of the taking lens is set to the measured main object distance and the shutter is activated to photograph the scene. An original fame of the scene image is created on a photographic film such as a color negative film. In photographing a focussed main object located out of the central area of a scene by using a camera of the one-point distance measuring type, it is necessary to provide a focus lock in order to focus the main object. In operation of the focus lock, first a main object is located at the target mark and the release button is half depressed to measure the distance to the main object. Next, the camera is pointed at a different area to determine a desired framing of the scene while maintaining the half depression of the release button, and thereafter it is fully depressed.

For the multi-point distance measuring type, a plurality of measuring points are provided for one scene, and the distance measuring is accomplished for each point. A plurality of object distances are obtained, one of which is selected as main object distance for focussing the taking lens. Of a plurality of distances as measured, the shortest object distance is commonly used as the main object distance from an empirical rule that the main object is located on the near distance side. For the multi-point distance measuring type, there are ordinarily about 5 distance measuring points at most, and they are set only at the central area of a scene in the horizontal direction. Therefore, if a main object is located outside of the measuring point area, a focus lock becomes necessary to properly focus the scene.

Both the one-point and multi-point distance measuring types, require cumbersome operations of the focus lock, and, therefore, good photographs might be missed in some cases. Since the multi-point distance measuring type uses the method of near distance priority, the taking lens will be focused to any object in front of the main object, resulting in improper focussing. Furthermore, if the taking exposure is controlled on the basis of the brightness of a main object, the brightness of an object determined incorrectly as the main object would be erroneously used for the taking exposure control.

There is also known a camera of the type wherein a reflected light from a scene illuminated by a flash light during flash photographing is measured, and the taking exposure is controlled by an integrated value of reflected light beams. With a camera of this type, if an object having an extremely high reflectance is located near a main object, it is not possible to properly expose the main object because of the high amount of reflected light from the object near the main object.

With a conventional photographic printing method, an elementary printing exposure amount is determined by an average density, e.g., LATD (Large Area Transmittance Density), of an original frame of a photographic film. A print correction amount is calculated according to the characteristic feature, e.g., rear light scene, extracted from the original frame. The elementary printing exposure amount is corrected using the calculated print correction amount. Using the corrected printing exposure amount, the original frame is printed on a photographic paper. If the density is for different from the LATD, it is necessary to determine the print correction amount from the density of the main object image, so as to the image at a proper printing exposure amount. However, the density of the main object image cannot be estimated correctly because the position of the main object image within the original frame is unknown. In particular, if the position of the main object image is not at the central area of the original frame, it is difficult to estimate the density of the main subject image. This lowers the correction precision of the printing exposure amount.

Automatic exposure control systems for camera have become highly precise, and so the image of a main object can be photographed on a photographic film at a proper density. It is therefore often possible to print the image of a main object on a photographic paper at a proper density, without measuring the density of the original frame, only by supplying a printing exposure time preset for each type of a photographic paper and each printing magnification. However, if the density of a main object image is far different from the LATD, this image cannot be printed at an optimum density when such a preset printing exposure time is used.

SUMMARY OF THE INVENTION

It is a principal object of the present invention to provide a method of automatically controlling the focussing and taking exposure amount, without the use of a focus lock even if a main object is not located at the central area of a scene.

It is another object of the present invention to provide a method of automatically controlling the focussing and taking exposure amount, on the basis of an automatically detected main object, even if the main object is not located at the central area of a scene.

It is a further object of the present invention to provide a camera capable of photographing a main object in a scene at a proper taking exposure amount even if an object having an extremely high reflectance is present near the main object.

It is a still further object of the present invention to provide a method of producing a photographic print with a main object that has a proper image density.

In order to achieve the above and other objects of the present invention, the focussing control is made in accordance with a distance to a main object which is assumed as a moving object within a scene to be photographed, and the taking exposure is controlled in accordance with the brightness of the main object. Most scenes have as their main objects human figures which are in motion. This motion can be detected from a change of the distance and brightness of an object within a scene. If a still object such as flowers and buildings is main object, there is no motion in the scene. In this case, similar to conventional cameras, the main object is identified on the basis of a near distance priority, and the focussing and taking exposure controls are made in accordance with the identified main object.

A scene to be photographed is divided into N scene divisional areas in the form of matrix, and the brightness of each scene divisional area is measured. One distance measuring point is provided for each scene divisional area. In detecting a moving object on the basis of a change in distance, the change in distance data at two different times having a small time difference therebetween is checked at each distance measuring point. A difference $\Delta Di(t)$ is calculated between distance data $Di(t)$ at time t and distance data $Di(t-\Delta t)$ at time $(t-\Delta)$, respectively at a particular distance measuring point. If the absolute value of this difference $\Delta Di(t)$ is greater than a threshold value ThD, this distance measuring point is judged as having "motion". This judgement is performed for all distance measuring points ($i=1$ to N). The distance measuring points judged as having "motion" are used as main object candidate points. Of the main object candidate points, a distance measuring point having the distance data of the shortest distance and distance measuring points having the distance data within a predetermined value range $\epsilon$ from the shortest distance data, are judged as effective distance measuring points where a main object is assumed to be present. The distance and brightness extracted from these effective distance measuring points and corresponding effective scene divisional areas are used for the automatic focussing and taking exposure controls.

In detecting a "motion" from a change in brightness, a difference is calculated between brightness data $Bi(t)$ at time t and brightness data $Bi(t-\Delta t)$ at time $(t-\Delta t)$, respectively at a particular scene divisional area i. If the absolute value of this difference $\Delta Bi(t)$ is greater than a threshold value ThB, this scene divisional area is judged as having "motion". This judgement is performed for all scene divisional areas ($i=1$ to N). The scene divisional areas judged as having a "motion" are used as main object candidate areas. The distance data of distance measuring points within the main object candidate areas is checked. A distance measuring point having the distance data of the shortest distance and distance measuring points having the distance data within a predetermined value range $\epsilon$ from the shortest distance data, are judged as effective distance measuring points where a main object is assumed to be present. The distance and brightness extracted from these effective distance measuring points and corresponding effective scene divisional areas are used for the automatic focussing and taking exposure controls.

According to the present invention, a number of distance measuring points and scene divisional areas are set two-dimensionally, a change with time in distance data at each distance measuring point and a change with time in brightness data at each scene divisional area are detected, and a main object area within a scene is identified from the distance measuring point or scene divisional area having the change with time in excess of a threshold value, allowing a reliable detection of a main object which is in motion. Therefore, it is not necessary to perform a conventional focus lock, while providing a desired framing of a scene. In addition, the focussing and taking exposure controls can be accomplished without being influenced by the background or foreground, while primarily considering the moving main object.

According to a preferred embodiment of the present invention, a scene divisional area having a color hue similar to human flesh color is extracted from identified effective scene divisional areas, to identify a flesh colored area. In accordance with the brightness data of the flesh colored area, the taking exposure is controlled. In identifying the flesh colored area, a flash device is activated before photographing, and reflected light from the main object is measured for each effective scene divisional area to obtain a reflectance of each portion of the main object present within the scene divisional area. Each reflectance is compared with a preset reflectance of flesh to extract the flesh area from the main object. According to this embodiment, it is possible to record a facial image of a person on a photographic film at an optimum density. For example, even for a person wearing white or black clothes, the density of a facial image can be optimized without being influenced by the color of clothes.

According to another preferred embodiment of the present invention, main object position information, divisional photometry information (pattern type, brightness of each scene divisional area), and taking exposure amount are recorded on the photographic film when photographing a scene with a camera and creating an original frame. During printing with a photographic printer, a first parameter is obtained which is a difference between the brightness of each scene divisional area and the taking exposure amount, respectively read from the photographic film. An original frame to be printed is divided into a plurality of frame divisional areas in correspondence with the scene divisional areas used for the photographing. The density of each frame divisional area is measured and used as a second parameter. The first and second parameter data is collected for each of K (an integer) original frames, and a regression line is obtained from a two-dimensional plane composed of a set of first and second parameters. A shift amount of the regression line from a predetermined ideal regression line is calculated as a weighted average of data differences on the two regression lines at m (an integer) sampling points. In accordance with the shift amount, a preset ideal elementary printing exposure amount is corrected to determine an elementary printing exposure amount. This elementary printing exposure amount is used when printing K original frames to obtain a frame correction amount specific to each original frame, and if necessary, to obtain a final printing exposure amount. K original frames are usually all of the original frames of one roll of photographic film.

According to this embodiment, a high print quality can be maintained without being affected by differences between the characteristics of photographic films, camera types and photographic printers. In addition, since printing is performed in accordance with the elementary printing exposure calculated as above, variation of densities for original frames of one roll of photographic film can accounted for. Furthermore, the frame correction amount is calculated for each original frame in accordance with the main object position information, and the elementary printing exposure amount is corrected by using the frame correction amount, thereby further improving the print quality. A main object image can thus be printed on a photographic paper with higher quality than a conventional printing exposure control method using only the density information of an original frame.

BRIEF DESCRIPTION OF THE DRAWINGS

The above and other objects and advantages of the present invention will become apparent from the detailed description of the preferred embodiments when read in conjunction with the accompanying drawings, in which:

FIG. 17 is a flow chart illustrating the procedure of producing photographic prints when using the photographic printer shown in FIG. 13 and the camera shown in FIG. 11.

DETAILED DESCRIPTION OF THE PREFERRED EMBODIMENTS

Figure 1:
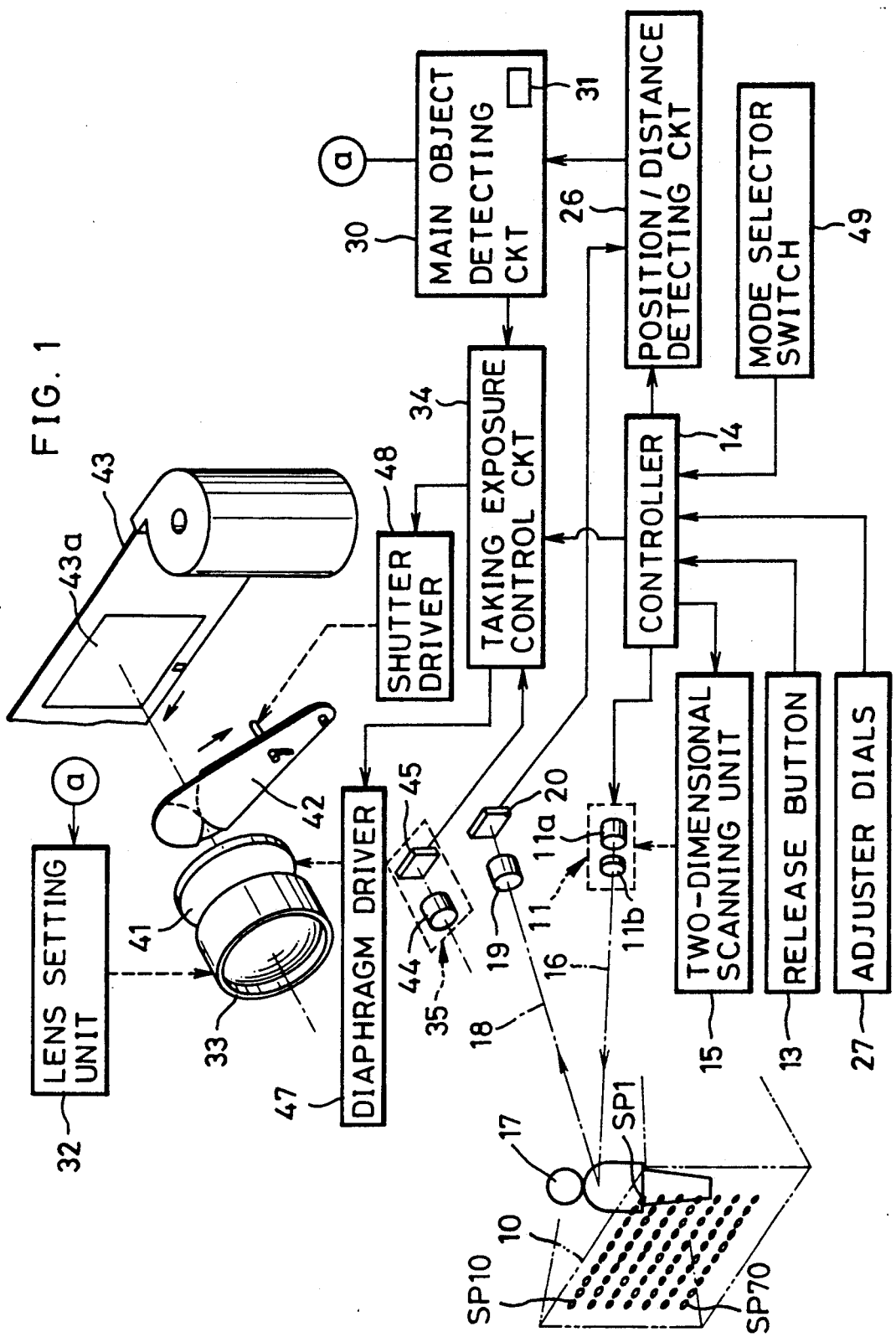
FIG. 1 is a schematic diagram showing a camera embodying the present invention.

Referring to FIG. 1 illustrating an automatic focussing camera of a multi-point distance measuring type, a light projector 11 is mounted on the front side of a camera body (not shown). The light projector 11 has a light source 11a for radiating a near infrared ray, and a lens 11b. When a release button 13 is half depressed, a controller 14 controls the light source 11a and a two-dimensional scanning unit 15 to start a distance measuring sequence. The two-dimensional scanning unit 15 cause the light source 11a to scan in the two-dimensional direction to direct it sequentially to distance measuring points SP1 to SP70 defined in a scene to be photographed. Synchronously with scanning by the two-dimensional scanning unit 15, the light source 11a is intermittently flashed to project a near infrared ray to each of the distance measuring points SP1 to SP70 from the light projector 11. A reflected light of the projected infrared ray from, for example, a main object, falls incident via a lens 19 on a light incident position detector, such as an image sensor 20.

The controller 14 has a pulse counter which counts drive pulses supplied to the two-dimensional scanning unit 15 and thus detects the position of the scanned near infrared ray 16. At some point, this scan position corresponds to the position of the main object within the scene and also to the position of the main object on an original frame 43a recorded on a photographic film 43 such as a color negative film. The scan position signal is sent to a position/distance detecting circuit 26. Although the light source 11a is pulsed and the near infrared ray is intermittently scanned in this embodiment, the light source 11a may be activated continuously to linearly scan the scene 10.

The position/distance detecting circuit 26 detects the incident position of the reflected light 18 based on a time sequential signal from the image area sensor 20. Based on the light incident position and scan position, the circuit 26 obtains the distance to each object at each of the distance measuring points SP1 to SP70, and outputs distance data. The system can be configured so that if an object, which is closer than a predetermined distance, e.g., 8 m, is present, the reflected light from this object falls incident on the image area sensor 20. If an object is further than 8 m, the reflected light cannot be detected by the image sensor 20. In this case, the position/distance detecting circuit 26 judges that the object is at an infinite distance.

While the release button 13 is half depressed, the controller 14 obtains the distance data Di(t) at each of the distance measuring points at a predetermined time interval $\Delta t$, i represents each distance measuring point and takes a value from 1 to 70 in the preferred embodiment. The distance data Di(t) obtained at the predetermined time interval $\Delta t$ is stored in a memory 31 of a main object detecting circuit or unit 30. The main object detecting unit 30 obtains a difference data $\Delta Di(t)$ between the preceding distance data $Di(t-\Delta t)$ stored in the memory 31 and the presently detected distance data Di(t). If the absolute value of the difference data $\Delta Di(t)$ is larger than a threshold value ThD, it is judged that the distance measuring point corresponds to a moving subject. This judgement is made for all the distance measuring points SP1 to SP70. The distance measuring points judged as having "motion" are used as main object candidate points.

Next, the main object detecting unit 30 determines the main object candidate points which are present within a predetermined distance range from the nearest distance, as effective distance measuring points where a main object is assumed to be present. A main object distance for focussing the taking lens 33 is obtained on the basis of the distance data of these effective distance measuring points. Specifically, it is judged that a main object is present at a distance measuring point j if $(D_j(t) - D_{min}) < \epsilon$, where Dmin is the nearest distance data among the distance data of the main object candidate points as having "motion", j is the distance measuring point number judged as having "motion", and $\epsilon$ is a predetermined threshold value. The main object detecting unit 30 sends the determined main object distance to a lens setting unit 32. In accordance with the main object distance, the lens setting unit 32 adjusts the set position of the taking lens 33 to focus it to the determined main object 17.

Figure 2:
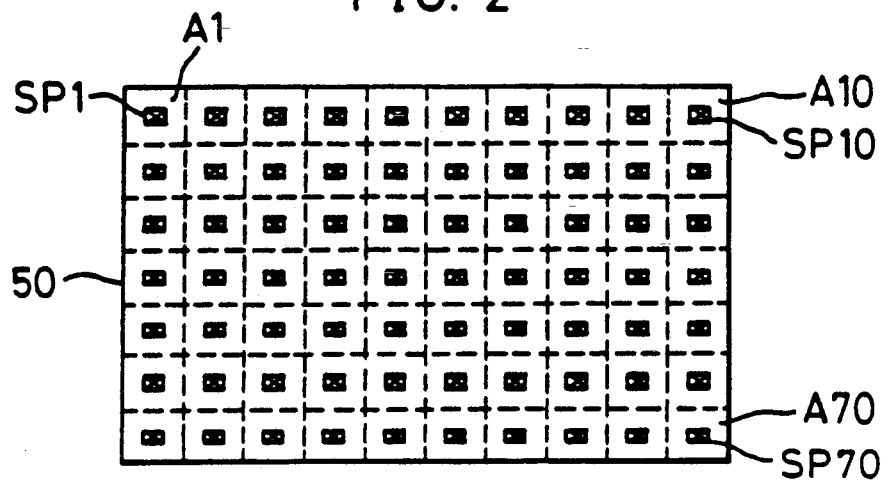
FIG. 2 illustrates an example of scene divisional areas divided in a matrix form and distance measuring points.

A photometry unit 35, which consists of a lens 44 and an image sensor 45, sends a time sequential signal from the image sensor 45 to a taking exposure control circuit 34 synchronously with the distance measuring timings when the release button 13 is half depressed. As shown in FIG. 2, the taking exposure control circuit 34 obtains a brightness (BV) at each scene divisional area A1 to A70 within a matrix 10×7 of a photometry area 50. Each of the distance measuring points Sp1 to SP70 is set at the center of each of the scene divisional areas A1 to A70. In this embodiment, the photometry area 50 has a size smaller than that of the scene 10, neglecting its outer peripheral portion. The photometry area 50 may be otherwise coincident with the scene 10. Also, distance measuring points may be set only at the central area of the photometry area 50.

Data representing the effective distance measuring point judged as containing a main object is inputted from the main object detecting circuit 30 to the taking exposure control circuit 34. From the brightness of the scene divisional areas corresponding to the effective distance measuring point, the main object brightness is calculated. From the main object brightness and film sensitivity, a light value (LV) is calculated to program control a diaphragm driver 47 and shutter driver 48 in accordance with the light value. If there is a plurality of effective scene divisional areas, an average of brightness data is used as the main object brightness. The brightness data may be weighted by the positions of the effective scene divisional areas to obtain an arithmetic mean. The taking exposure control circuit 34 also has a known object brightness judging circuit which operates to automatically activate an electronic flash synchronously with a shutter mechanism if the brightness of the main object is low.

Mounted behind the taking lens are a known diaphragm mechanism 41 and shutter mechanism 42 which are activated to form an original frame with the image of the scene 10 on the photographic film 43, when the release button 13 is depressed further from the half depressed state. The value $\Delta t$, ThD, $\epsilon$ and the like can be predeterminately set to desired values by using adjuster dials 27. A switch 49 selects one of several focussing modes including a main object auto-detecting mode for detecting the above-described "motion", a near distance priority mode, a scene central area priority mode, and the like.

Figure 3:
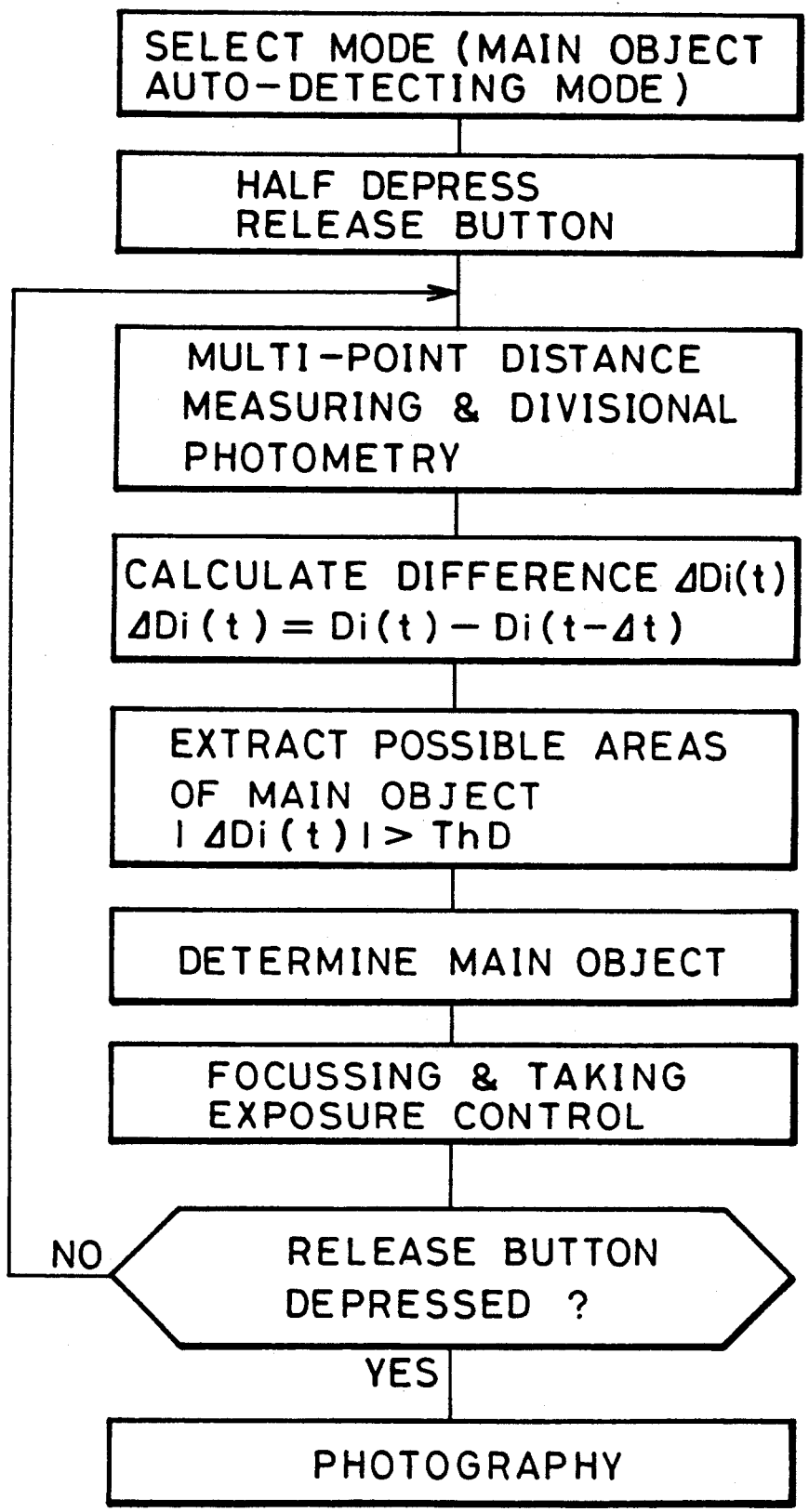
FIG. 3 is a flow chart illustrating the procedure of focussing control and taking exposure control when an automatic main object determining mode is selected.

Referring to FIG. 3, the operation of the above-described embodiment will be described. First, the mode select switch 49 is operated to select the main object auto-detecting mode. Next, the camera is directed toward the scene 10 to perform framing, and thereafter the release button 13 is half depressed. During this half depressing period, the distance measuring and photometry are periodically performed at the timer interval $\Delta t$. Data at the present time t and the data at the time $(t - \Delta t)$ are stored in the memory 31. The data at the time $(t - \Delta t)$ is deleted when the next data $(t + \Delta t)$ is fetched).

After the distance data Di(t) at the time t is fetched, the main object detecting unit 30 calculates a difference $\Delta D_i(t)$ between the data Di and the data Di $(t - \Delta t)$ at the time $(t - \Delta t)$. Next, the distance measuring points having the difference $\Delta D_i(t)$ larger than the threshold value ThD are extracted.

Figure 4:
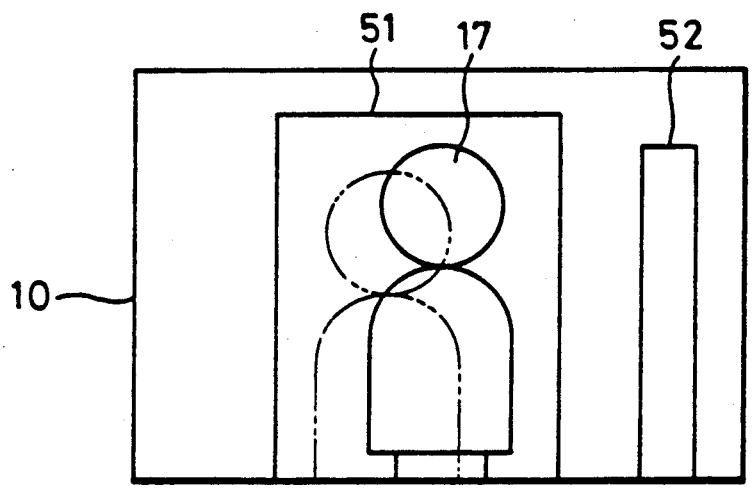
FIG. 4 illustrates an example of a scene having a main object with motion.

In the scene 10 shown in FIG. 4, the figure of a person 17 at the time $(t - \Delta t)$ was located at the position depicted by a two-dot-chain line, and it has moved at the time t to the position depicted by a solid line. Since the person 17 moves to the upper right direction in the scene 10, the distance data difference $\Delta D_i(t)$ at the distance measuring point where the person was located or is presently located, is larger than the threshold value ThD. Other objects 50 and 51 have no distance data change and are thus judged as still objects.

Figure 5:
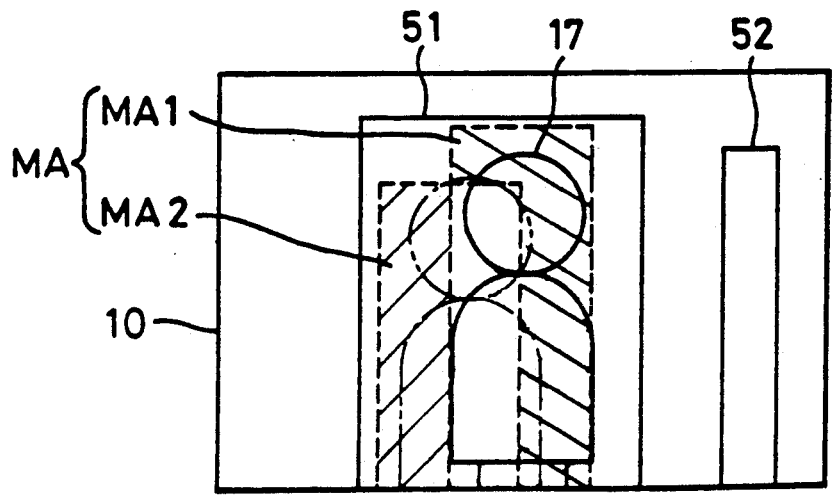
FIG. 5 illustrates main object candidate areas and a main object area of the scene shown in FIG. 4.

As shown in FIG. 5, a main object candidate area MA1 (indicated by cross hatching) of the person 17 at the present time t and a main object candidate area MA2 (indicated by batching) of the person 17 at the time $(t - \Delta t)$ are detected as main object candidate areas MA. It is necessary to extract the main object area MA1 from the other main object candidate areas MA. To this end, extracted as the effective distance measuring points are the distance measuring points within the main object candidate areas MA having at the time t the shortest distance data and having distance data falling within the predetermined range $\epsilon$ from the shortest distance data.

Of the distance data at the extracted effective distance measuring points, the shortest distance data is determined as the main object distance data. A plurality of scene divisional areas corresponding to the effective distance measuring points are selected to obtain an arithmetic mean of brightness data at these points, determining the arithmetic mean as the main object brightness. After this determination, photographing of the scene is accomplished upon detection of the full depression of the release button 13. First, using the main object distance data, the focus of the taking lens 33 is adjusted. Next, using the main object brightness data, the diaphragm mechanism 41 and shutter mechanism 42 are controlled to take the scene. In this manner, the image of the scene is created as the original frame on the negative film 43.

If the main object candidate area cannot be extracted because there is no detected change with time in the distance data of objects, the main object is assumed to be located at the distance measuring point having the shortest distance data, for use in the control of focussing and taking exposure amount. If the mode select switch 49 selects the nearest distance priority mode, the object at the nearest distance is judged as the main object irrespective of a detected presence/absence of motion, for use in the controls of focussing and taking exposure amount. If the central area priority mode is selected, distance measuring points at the central area of the scene are validated, and an object at the nearest distance among the validated distance measuring points is judged as the main object.

Motion of an object may be detected from a change in brightness data of each scene divisional area, as opposed to a change in distance data at a number of distance measuring points. In this case, a difference $\Delta B_i(t)$ between the brightness data Bi(t) at the time t and the brightness data Bi$(t - \Delta t)$ at the time $(t - \Delta t)$ is obtained. If the absolute value of the difference is larger than an threshold value ThB, it is judged that the corresponding scene divisional area i has "motion". By using the distance measuring points corresponding to the scene divisional areas judged as having "motion", the effective distance measuring points are obtained in the similar manner described above. In accordance with the effective distance measuring points, the main object distance is obtained, and the main object brightness is calculated from the effective scene divisional areas.

In the above embodiments, after the main object auto-detecting mode is selected, the release button is half depressed to start the distance measuring and photometry at the predetermined time interval. However, the distance measuring sequence may be started upon actuation of a dedicated switch or in response to a change of a camera posture detected by a camera posture detecting sensor. The time interval Δt may be set to any desired value by a photographer, allowing the photographer to extract only the desired main subject from various objects moving at different speeds.

A zoom lens may be used as the taking lens 33. In this case, the automatic zooming starts when detecting a motion of an object within a scene to thus obtain the focus nearest the value which has been preset for the main object within the scene in accordance with the changed distance and intra-frame position of the main object. The embodiment may be applied to a monitor camera capable of automatically controlling the posture of the camera so as to locate a discriminated main object at the central area of the original frame. Also, shutter release operation may be automatically effected while detecting motion, to create a series of various original frames at different positions.

In the case of a camera which controls the taking exposure during flash photography by measuring a reflected light from a scene, if a scene having an object with an extremely high reflectance is taken, the main object becomes under-exposed because of the influence of large amount of reflected light. Another embodiment illustrated in FIGS. 6 to 10 provides for flash photography of such a scene with a main object taken at a proper exposure amount. Similar elements and to those shown in FIGS. 1 to 5 are represented in this embodiment by using the same reference numerals.

Figure 7:
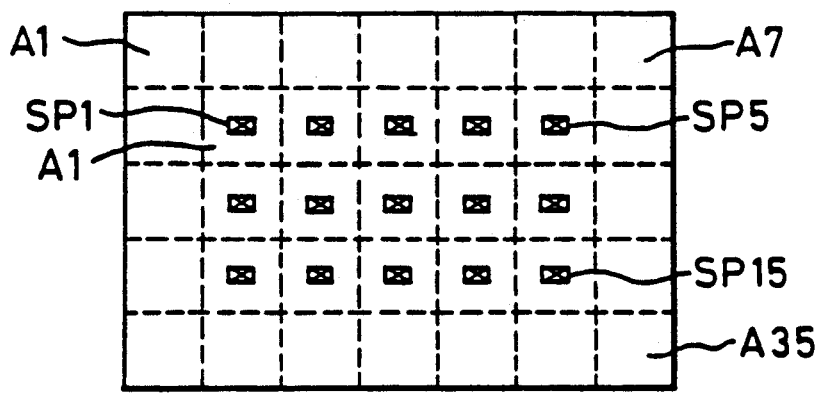
FIG. 7 illustrates an example of scene divisional areas and distance measuring points when using the camera shown in FIG. 6.

As shown in FIG. 7, a scene to be photographed is divided into scene divisional areas A1 to A35 of a 7×5 matrix, and the brightness of each area is measured. Distance measuring points SP1 to SP15 correspond to the scene divisional area A9 to A13, A16 to A20, and A23 to A27 at the central area of the scene. Of course, the scene may be divided into scene divisional areas of a 10×7 matrix of the first embodiment, for the measurement of the brightness of each area. When the release button 13 is half depressed, the distance measuring and photometry are performed simultaneously. As described previously, the position/distance detecting circuit 26 outputs distance data Dn (n takes a value from 1 to 15 representing distance measuring points) at each distance measuring point SP1 to SP15, and sends the distance data to the main object detecting unit 30. Similar to the first embodiment, the distance measuring may be repeated at a predetermined time interval to supply the updated distance data Dn to the main object detecting unit 30.

The main object detecting unit 30 determines the shortest distance data Dmin from among the distance data D1 to D15 at the distance measuring points SP1 to SP15, as the main object distance. In accordance with the main object distance, the focus of the taking lens 33 is adjusted. An object present at distance measuring points within a predetermined distance range from the shortest distance data Dmin and at the distance measuring point having the shortest distance data Dmin, is judged as the main object. Namely, if $(dn - Dmin) < \epsilon$ is satisfied, this distance measuring point SPn is judged as an effective distance measuring point where the main object is located. The value $\epsilon$ is a predetermined threshold value.

The main object detecting circuit 30 sends data representing the effective distance measuring points to a reflectance calculator 55. The reflectance calculator 55 obtains the brightness (BV0) before pre-flashing of a flash device 56 and the brightness (BV1) during pre-flashing, respectively, for each of the effective scene divisional area corresponding to the effective distance measuring point, and stores these brightness data in a memory 55a. The reflectance calculator 55 is supplied with a flash light amount (FL0) from the flash device 56 and a taking magnification data (TM) from the lens setting unit 32. In accordance with the taking magnification data (TM), the reflectance calculator 55 obtains an area S of each effective scene divisional area on the scene. The reflectance calculator 55 also calculates from the following equation (1) a flash light amount FL1 per unit area which has reached the main object, using the distance to the corresponding effective distance SD.

$$FL1 = FL0 \cdot Ka/SD^2 \qquad (1)$$

where Ka is a constant specific to the flash device 56. Similarly, the reflectance calculator 55 calculates a flash reflected light amount FB1 per unit area of the effective scene divisional area from the following equation (2).

$$FB1 = (BV1 - BV0) \cdot Kb/S \qquad (2)$$

where Kb is an experimentally determined constant. The reflectance calculator 55 calculates a reflectance R from the following equation.

$$R = FB1/FL1 \qquad (3)$$

The reflectance calculator 55 sends the calculated reflectance R at each effective scene divisional area to a flesh color extractor 57 which compares each effective scene divisional area reflectance R with a present reference value. If the reflectance R is within a certain range relative to the reference value, a portion of the main object at the effective scene divisional area is judged as a flesh portion (face). Information of this extracted effective scene divisional area is sent as flesh area data to the taking exposure control unit 34. The reference value is obtained on the basis of experiments made during developments of cameras, and is stored in advance in a memory 57a. Although the "flesh color" takes a flesh color on a positive image, it takes a complementary color on a negative image.

The taking exposure control circuit 34 obtains an arithmetic mean of brightness data at the scene divisional areas judged as the flesh colored areas, this arithmetic mean being used as the main object brightness. In accordance with the main object brightness and film sensitivity, a light value (LV) is calculated for the program control of taking exposure amount as described previously. The taking exposure control circuit 34 has a known object brightness judging circuit 34a which operates to automatically activate the flash device 56 synchronously with the shutter mechanism 42 if the object brightness at the flesh color area is low.

Figure 6:
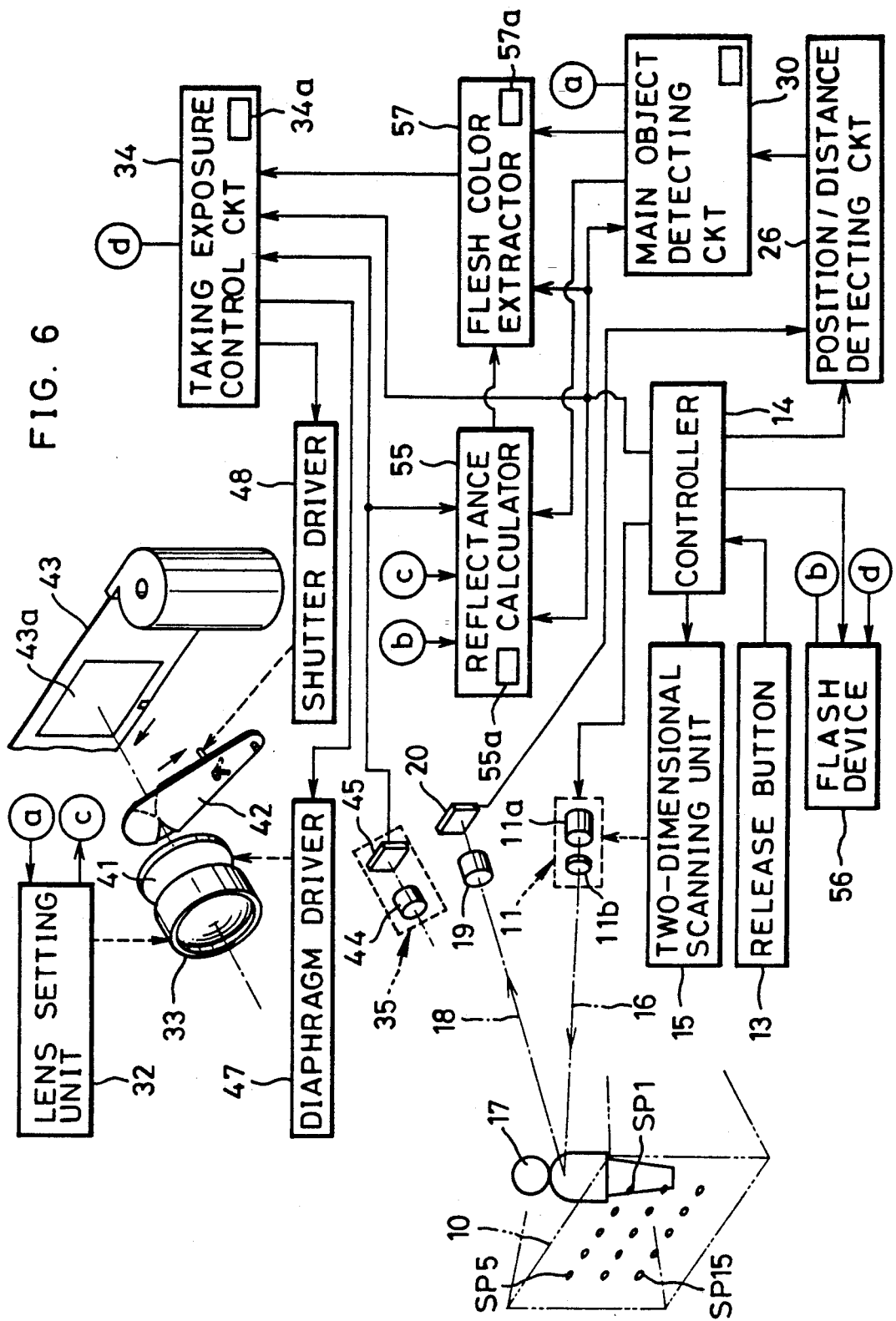
FIG. 6 is a schematic diagram showing a camera of an embodiment wherein the flesh colored area of a main object can be photographed at a proper exposure by using a flash device.
Figure 9:
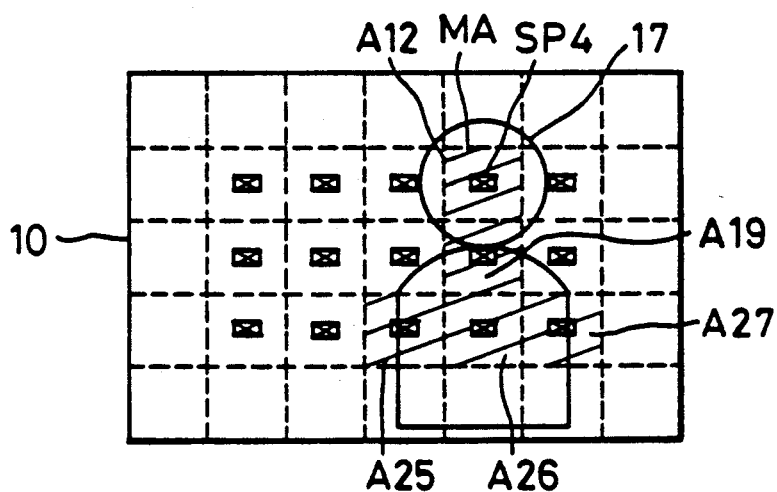
FIG. 9 illustrates how main object candidate areas are extracted.
Figure 10:
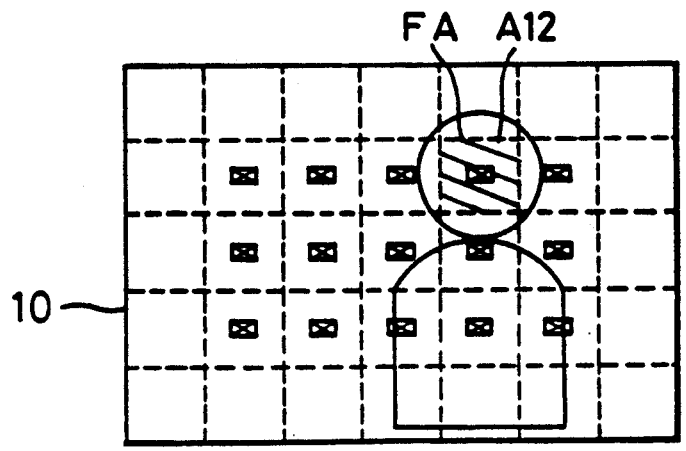
FIG. 10 illustrate how a flesh color area is extracted.
Figure 8:
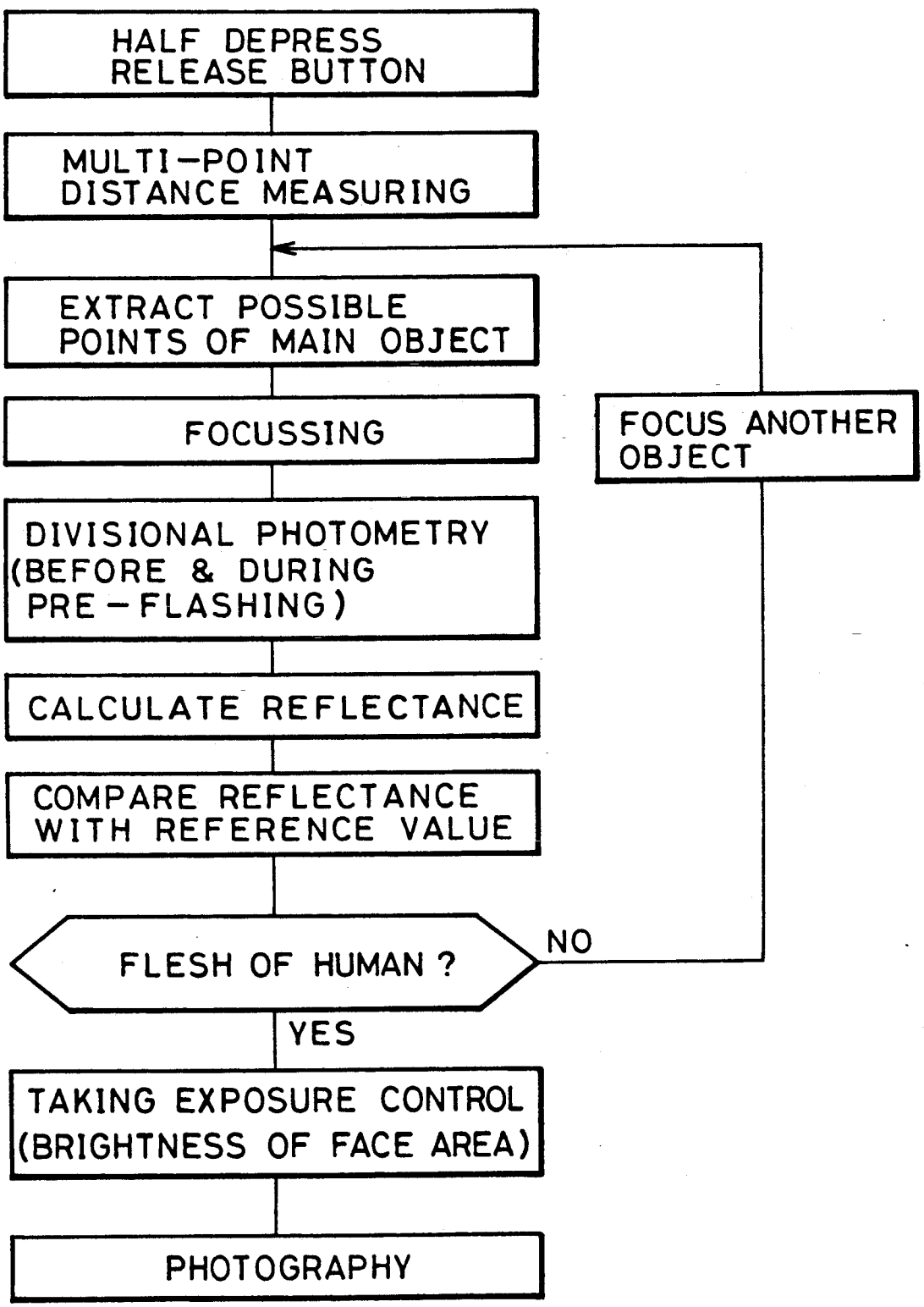
FIG. 8 is a flow chart illustrating the photographing procedure when using the camera shown in FIG. 6.

The operation of the embodiment shown in FIGS. 6 and 7 will be described with reference to FIGS. 8 to 10. When the release button 13 is half depressed after framing, the distance to each object located at each of the distance measuring points SP1 to SP15 of the scene to be taken is first measured. In accordance with the distance data at each distance measuring point SP1 to SP15, the main object detecting circuit 30 determines the distance measuring points having the shortest distance data and having the distance data within the predetermined range from the shortest distance, as the effective distance measuring points. In the case of a scene shown in FIG. 9, the distance measuring points SP4, SP9, SP13 to SP15 are judged as the effective distance measuring points. An area constituted by the effective scene divisional areas A12, A19, A25 to A27 corresponding to these effective distance measuring points is determined to be the main object candidate area MA indicated by hatching.

The brightness signal of each scene divisional area contained in the main object candidate area MA is sent to the reflectance calculator 55. The reflectance calculator 55 calculates the reflectance R of each scene divisional area A12, A19, and A25 to A27 by using equations (1) to (3), a signal representing each calculated reflectance is sent to the flesh color extractor 40 which compares each area reflectance signal with the reference value. The reference value represents the reflectance of a facial area of a person on a negative image. In this manner, the facial area FA of the person is extracted as indicated by cross hatching in FIG. 10. A signal representing the scene divisional area A12 where the facial area FA is located, is sent to the taking exposure control circuit 34 which then calculates the light value (LV) in accordance with the brightness signal for the scene divisional area A12 and film sensitivity. When the release button 13 is further depressed from the half depression state, the diaphragm driver 43 and shutter driver 44 are activated to photograph a scene with the facial area at the scene divisional area A12 at an optimum exposure amount.

If there is no facial area within the main object candidate area, the distance measuring point having the shortest distance among those having a distance longer than the distance (Dmin+ε) is subjected to the main object area judgement process. If the main object area still cannot be detected, the main object is judged as an object other than a person, and the distance measuring point having the shortest distance is judged as the effective distance measuring point to focus the camera at this shortest distance and control the taking exposure by using the brightness signal for the scene divisional area corresponding to this effective distance measuring point.

In this embodiment, the flesh area of the main object is discriminated in accordance with the reflectance at the main object candidate area. However, the main object may be discriminated by searching the reflection pattern most suitable for a distance and taking magnification, from reflection pattern data of a variety of objects experimentally obtained and stored in advance for various distances and taking magnifications. Although light is flashed once for the measurement of reflectance, the reflectance may be measured using red-eye effect eliminating pre-flashing light radiated several times. In this case, the reflectance is linearly estimated on the basis of the relationship between the light radiation amount and reflected light amount of stepwise pre-flashing. In this manner, the reflectance can be calculated at a high precision. A small amount of flash light is sufficient for the measurement of reflectance. The pre-flashing light can also be invisible light such as infrared light. To use this, a filter transmissible to infrared light is automatically inserted into the front of the flash tube. In this case, photographing is accomplished under natural light conditions.

FIGS. 11 to 16 illustrate an embodiment wherein position information and divisional photometry information recorded on a photographic film are read to print an image of the main object on color paper at a proper density. Similar elements to those shown in FIG. 1 are represented by using like reference numerals. Distance measuring points and scene divisional areas which are the same as shown in FIG. 7 are used in this embodiment.

Figure 11:
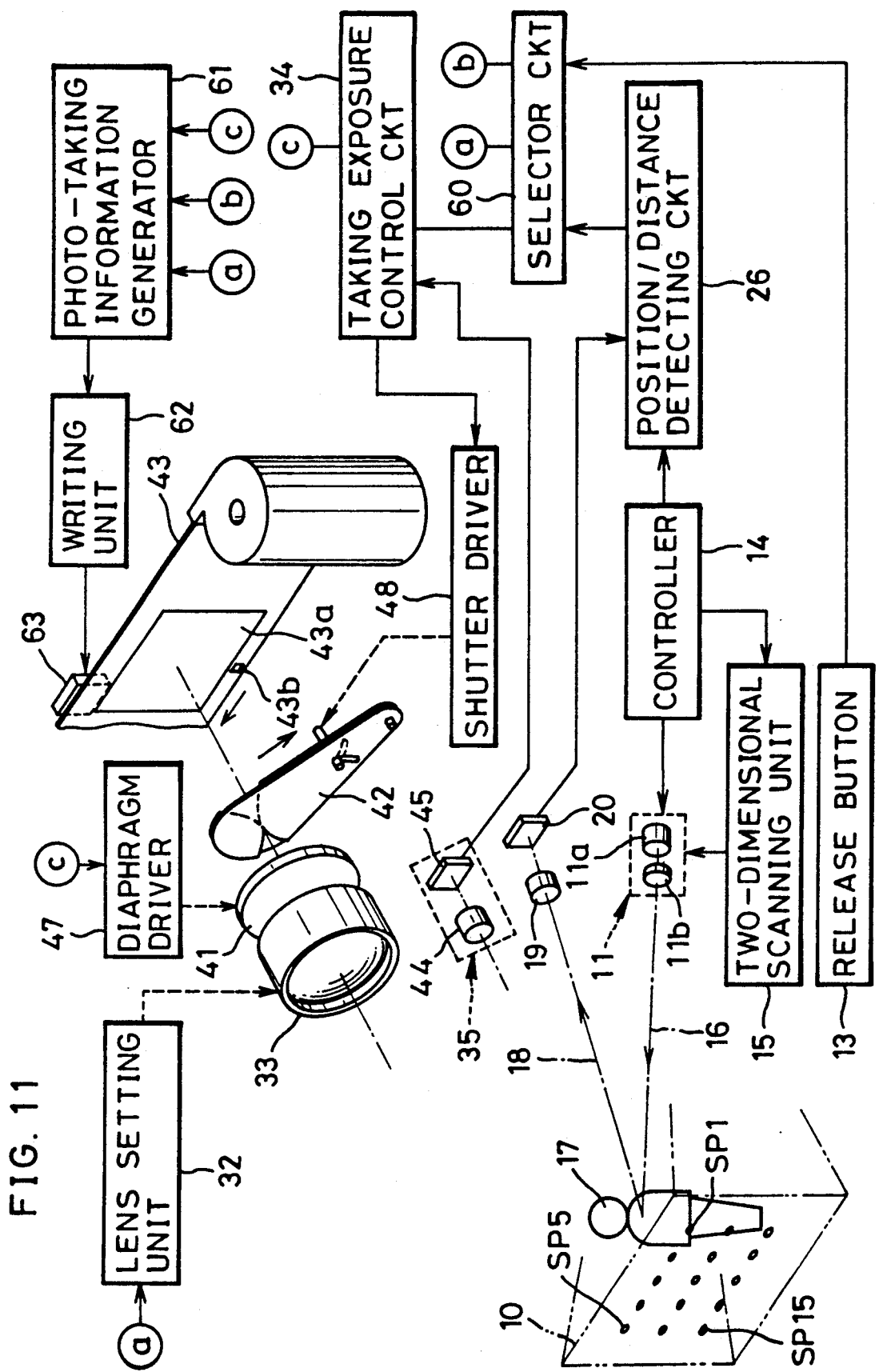
FIG. 11 is a schematic diagram showing a camera which records photo-taking information on a photographic film.

Referring to FIG. 11, a selector circuit 60 determines the main object in accordance with signals representing positions and distances of a plurality of objects. This determination is performed in the following manner. In determining the main object from a plurality of objects within a scene, the above-mentioned near distance priority method and frame central area priority method are generally used. In this embodiment, a main object at the nearest distance is determined by the nearest distance priority method, and position information of the main object is supplied to the lens setting unit 32, taking exposure control circuit 34, and to photo-taking information generator 61. Also, the above-described moving body detection method and flesh color extracting method may also be used for determining the position of the main object.

The photo-taking exposure control circuit 34 identifies an effective scene divisional area where the main object is located, in accordance with the main object position information supplied from the selector circuit 60. An exposure amount is calculated from the main object brightness obtained for the effective scene divisional area and film sensitivity. In accordance with the calculated exposure amount, the diaphragm driver 47 and shutter driver 48 are program controlled. The following relationship is satisfied:

$$SV+BV=AV+TV=EV \tag{4}$$

where BV is a main object brightness (luminance value), SV is a film speed value, EV is an exposure value, AV is an aperture value, and TV is a time value.

Using this equation (4), the diaphragm diameter and shutter speed of the camera are controlled in accordance with the main object brightness BV so as to make the amount of light incident on a photographic film having a certain sensitivity value constant. For example, in the taking exposure control, for a large (bright) main object brightness BV, the exposure value EV is set large, and for a small (dark) main object brightness BV, the exposure value EV is set small. In this manner, the density of the main object on a photographic film is maintained constant. As will be later described in detail, in a photographic printer, the exposure control is effected to obtain a constant exposure amount (elementary printing exposure amount) suitable for the density of a photographic film, to thereby obtain a proper density of the main object on a photographic print. In this manner, a high quality printing process can be accomplished, providing photographic prints with less variation in densities over a roll of a photographic film.

The photo-taking information generator 61 receives the main object position information as well as various photo-taking information such as divisional photometry information (types of divisional patterns, brightness of each scene divisional area), taking exposure value, taking magnification, film sensitivity value, diaphragm value, and photographing date. The photo-taking information generator 61 encodes the various photo-taking information and sends it to a writing unit 62. The writing unit 62 drives an LED 63 to record the photo-taking information in the form of digital code on an upper marginal area of an original frame 43a of a photographic film 43.

Figure 12:
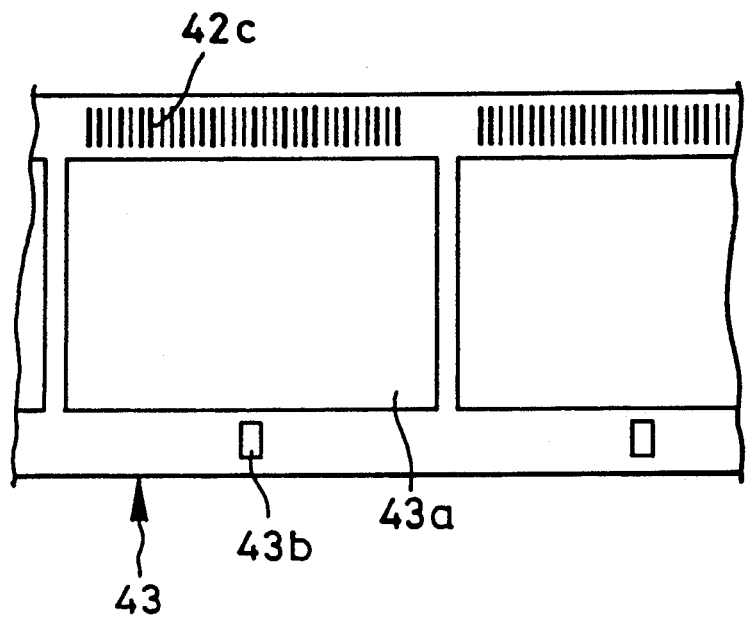
FIG. 12 is a plan view of a photographic film recorded with photo-taking information.

FIG. 12 illustrates an example of photo-taking information. A photographic film 43 has perforations 43b formed therein at an equal pitch. One frame advance is performed while detecting perforations 43b with a sensor. Each original frame 43a is created corresponding in position to each perforation 43b. On the marginal area opposite to the perforation 43b of each original frame 43a, a bar code 43c representing the photo-taking information is recorded.

Figure 13:
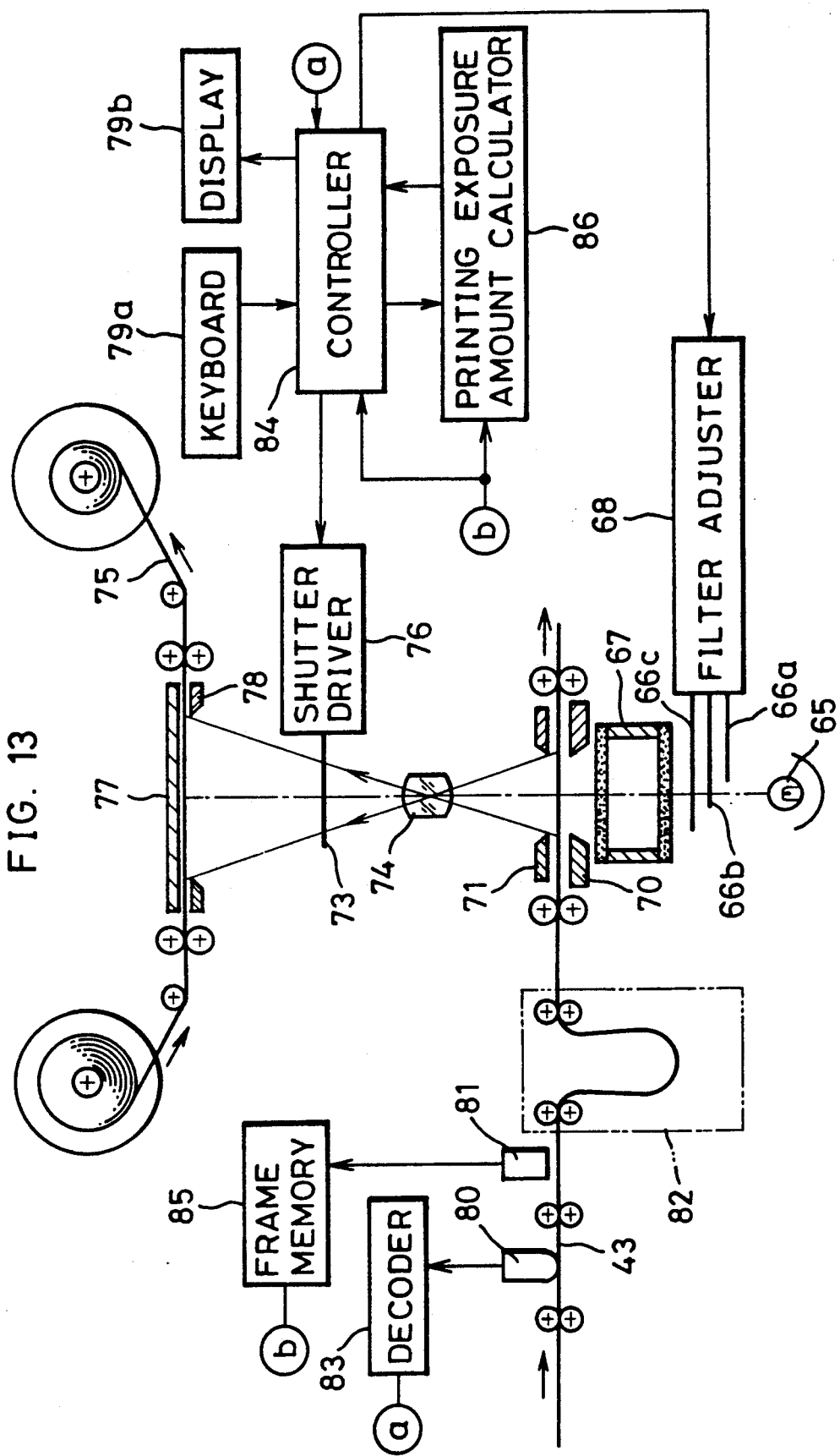
FIG. 13 is a schematic diagram showing a photographic printer.

FIG. 13 illustrates a photographic printer. White light radiated from a light source 65 passes through a cyan filter 66a, magenta filter 66b, and yellow filter 66c and enters a mixing box 67. These color correction filters 66a to 66c are fixed at predetermined positions during a normal print. For each frame wherein a print correction is desired, an operator enters a print correction amount from a keyboard 79a. In accordance with the correction amount, the insertion amounts of the color correction filters into the optical path are adjusted to control the three color components and intensities of printing light. The mixing box 67 is constructed of a rectangular tube having a mirror surface on its inner walls and diffusion plates at its top and bottom openings. Reference numeral 79b represents a liquid crystal display for displaying inputted data or the like.

A film carrier 70 is mounted at the printing stage. A developed photographic film 43 is set on the film carrier 70 and illuminated with printing light transmitted from the mixing box 67. Light transmitted through the photographic film 43 is projected via a printing lens 74 on the photosensitive emulsion layer of a color paper 75 while a shutter 73 is opened. The shutter 73 is opened for a predetermined time period by a shutter driver 76. The film carrier 70 has a film mask plate 71 to ensure flatness of the photographic film 43. As is well known, the film mask plate 71 has an opening corresponding in size to the original frame. The film mask plate 71 is lifted up by means of a solenoid (not shown) while the film is advance for the printing operation. Reference numeral 77 indicates a paper push plate, and reference numeral 78 indicates a paper mask plate.

Sequentially disposed on the inlet side of the printing stage are, a bar code reader 80, a scanner 81, and a film looper 82. The bar code reader 80 reads a bar code 43c recorded on each original frame while the photographic film 82 is advanced. Signals resenting the read bar code 43c are sent to a decoder 83 to decode them into data usable by the printer, and the decoded data is sent to a controller 84. The scanner 81, utilizing a known line sensor, performs three color separation and photometry for each point of a frame of the photographic film 43 synchronously with the film transportation, and the obtained data is sent to an image memory 85. Instead of a line sensor, an image area sensor may be used for the photometry of each frame. The film looper 82 reserves the photographic film 43 in a loop while image data of the film 43 is read by the bar code reader 80 and scanner 81.

Figure 14:
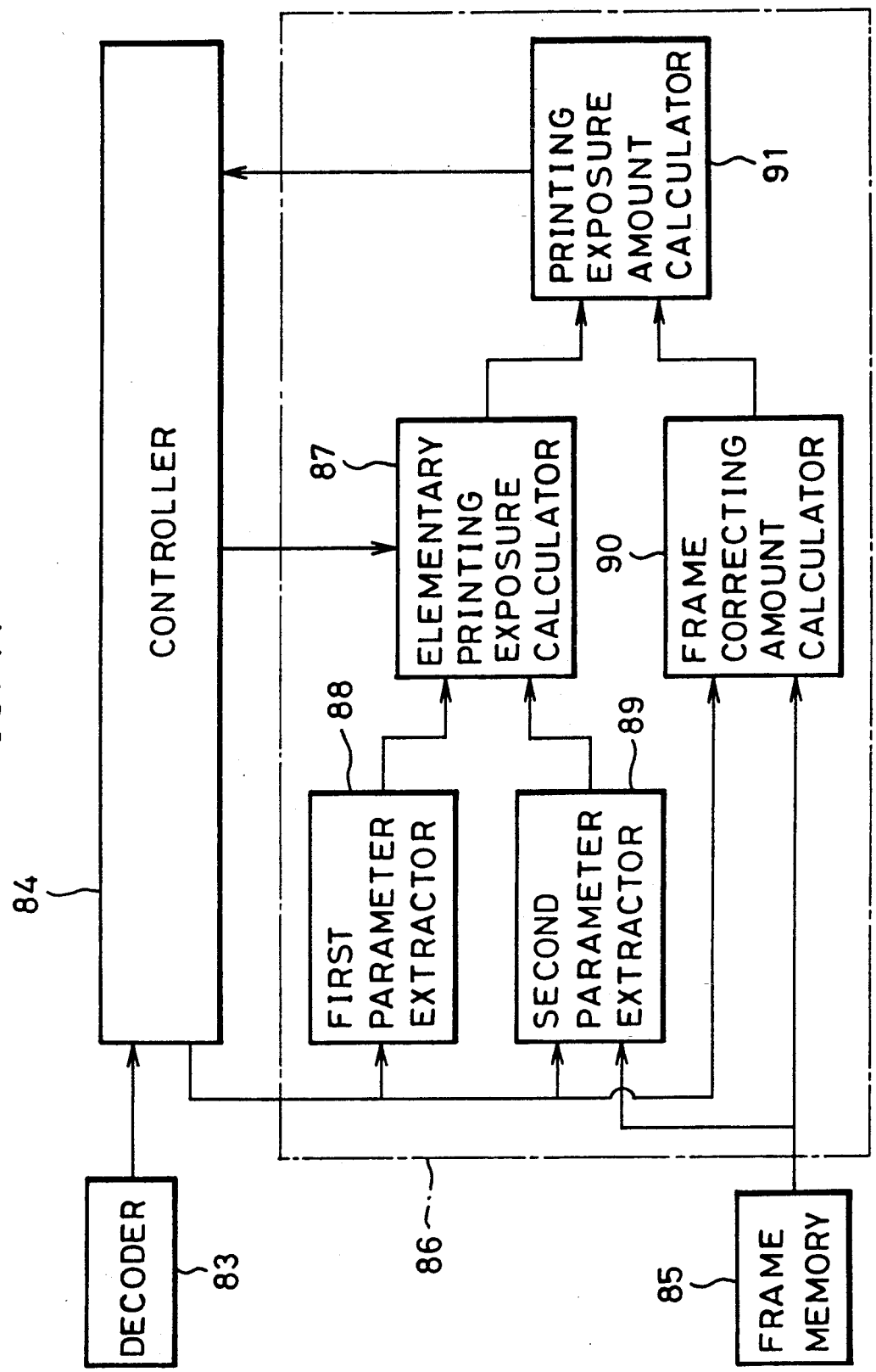
FIG. 14 is a block diagram showing a printing exposure amount calculator.

As shown in FIG. 14, a printing exposure amount calculator 86 has an elementary printing exposure calculator 87 which is supplied with first and second parameters xi and yi from first and second parameter extractors 88 and 89. The first parameter extractor 88 is supplied with the brightness value BVi of each scene divisional area, the aperture value AV, and the time value TV, among the photo-taking information supplied from the controller 84. The taking exposure value EV is calculated from the brightness value BVi of each scene divisional area and the time value TV. The first parameter xi (=Bvi−EV) is calculated by subtracting the taking exposure value EV from the brightness value BVi. The first parameter xi is associated with the light amount incident to each scene divisional area of the photographic film 43 during photographing.

Figure 15:
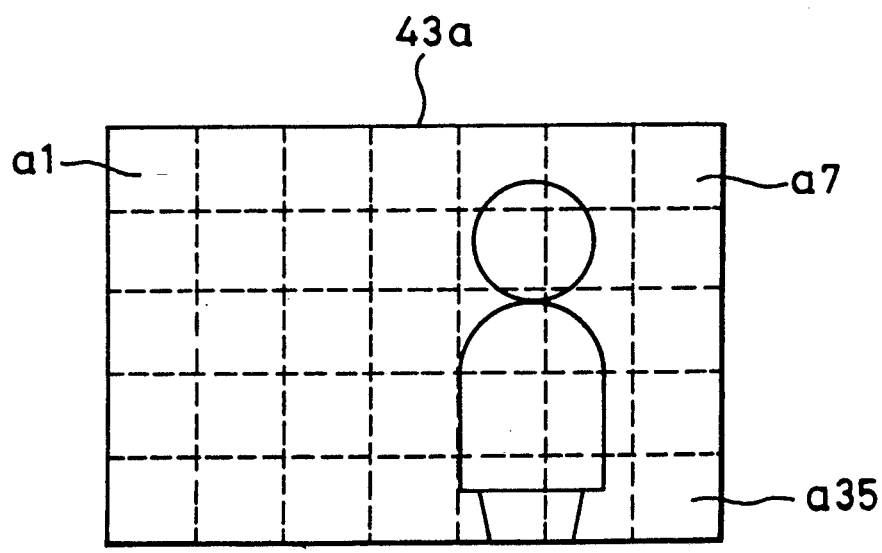
FIG. 15 illustrates frame divisional areas.

The second parameter extractor 89 is supplied with divisional photometry information from the controller 84. As shown in FIG. 15, the density data di (i is an area number and takes a value from 1 to 35) of each frame divisional area a1 to a35 obtained by dividing the original frame 43a in correspondence with scene divisional areas, is extracted from the image memory 85 as the second parameter yi.

Figure 16:
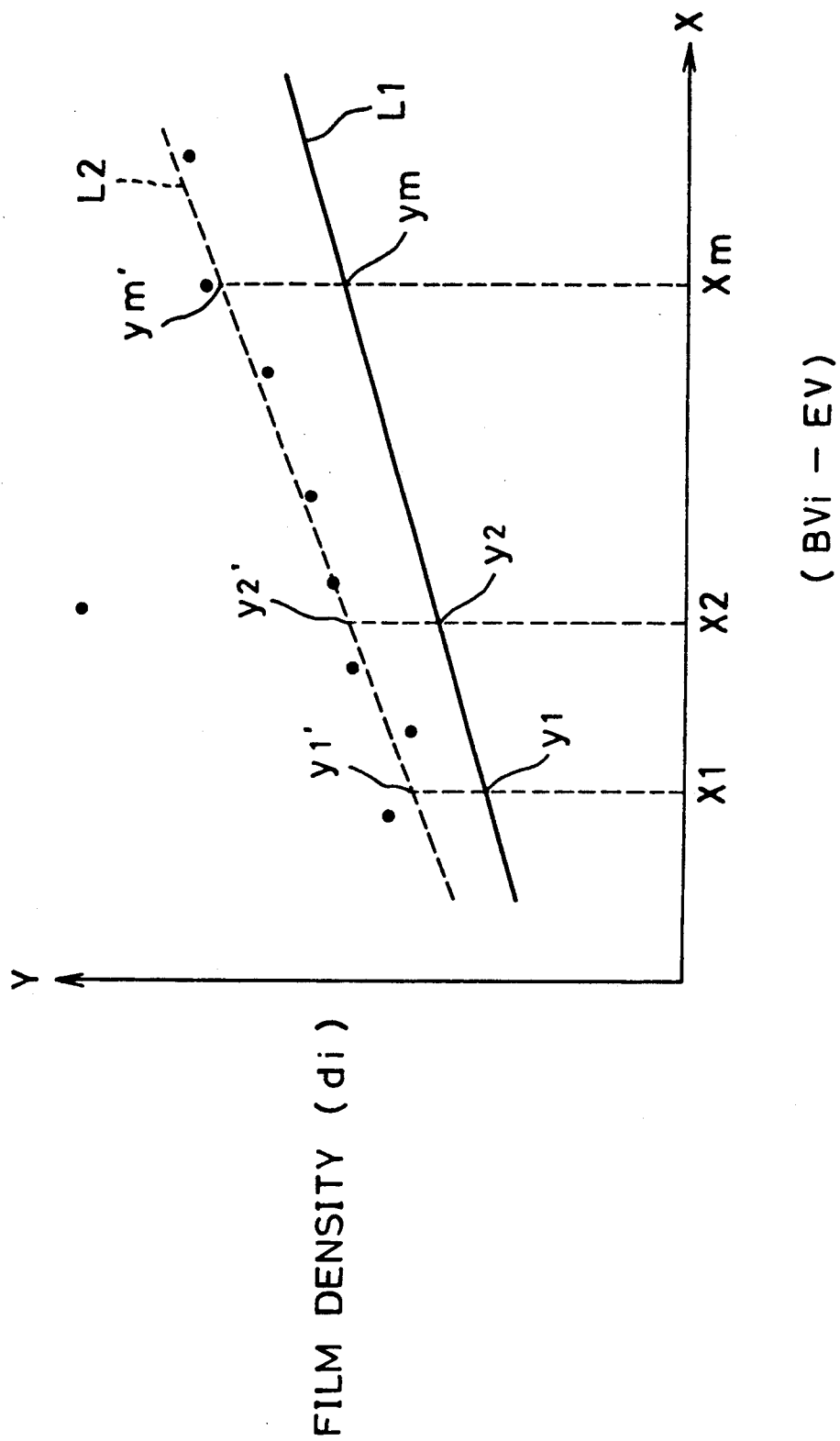
FIG. 16 illustrates the taking exposure control characteristics and the calculation of a standard printing exposure amount.

The relationship between the first and second parameters xi and yi (this relationship is called a taking exposure control characteristic hereinafter) can be approximated as a straight line as shown in FIG. 16. This regression line L1 is given by the following equation.

$$Y = a \cdot X + b \qquad (5)$$

where X is a data series of xi, Y is a data series of vi, a and b are a constants which can be obtained from the camera characteristics and photographic film characteristics or can be obtained experimentally. This regression line L1 is called an ideal taking exposure control characteristic which means it represents an ideal characteristic for a particular camera automatic exposure control and film combination. If the automatic exposure control for a camera and the film processing are performed ideally, the density of an image of the main object becomes constant. Therefore, the elementary printing exposure amount for the photographic printer can be determined from this density. The elementary printing exposure amount is called an ideal elementary printing exposure amount E0 which is determined from the ideal taking exposure control characteristic.

Each photographic film has a shift from the ideal taking exposure control characteristic because of differences in characteristics between photographic films, between production lots, effects of secular change, variations of precision in camera exposure controls, or the like. It is therefore necessary to correct the elementary printing exposure amount for a photographic film in accordance with the degree of such a shift. To this end, the elementary printing exposure amount calculator 87 calculates an elementary printing exposure amount E by using the following printing correction amount.

First, the elementary printing exposure amount calculator 87 obtains a shift between the ideal taking exposure control characteristic L1 and an actual taking exposure control characteristic L2 of a photographic film to be printed. This shift can be obtained from a weighted average of finite differences at m (an integer 1 or larger) points set at an equal pitch on the first parameters. The taking exposure control characteristic Y', of a photographic film is expressed by the following equation.

$$Y = a' \cdot X + b' \quad (6)$$

where $yi' = a' \cdot xi + b'$, and $i = 1$ to m.

This equation is transformed in the following equation using the shift value D.

$$D = \{(yi' - yi) \cdot wi\} \quad (7)$$

where $i = 1$ to m, and wi is a weighting coefficient which takes an optimum value obtained experimentally. The elementary printing exposure amount E for one roll of photographic film to be printed is given by the following equation.

$$E = E0 + c \cdot D \quad (8)$$

where c is a correction coefficient which takes an optimum value obtained experimentally.

For the calculation of the taking exposure control characteristic of one roll of photographic film, it is necessary to use N·K data where N is the number of data words per frame (corresponding to the number of frame divisional areas) and K is the number of frames. The number of frames or data necessary for determining the elementary exposure amount can be set as desired by setting a necessary mode. If the frame number K is set to "1", it is not necessary to pre-read image data of a predetermined number of frames of one roll of photographic film for the elementary printing exposure amount determining process.

A frame correcting amount calculator 90 calculates a frame correction amount ei for each frame relative to the elementary printing exposure amount E. Specifically, the frame correction amount ei is calculated by estimating the photo-taking state from the scene divisional area information and taking magnification information. First, the frame divisional area where the main object is present is identified by using the scene divisional area information and taking magnification information. Next, the density distribution and color information of the identified frame divisional area and peripheral frame divisional areas are checked to discriminate between the main object image and background image. Subsequently, the correction amount ei relative to the elementary printing exposure amount E is calculated so as to obtain an optimum density of the main object. The printing exposure calculator 91 adds the frame correction amount ei (i is the frame number) to the elementary printing exposure amount E to obtain the final printing exposure amount Ei' of each frame, this calculation being expressed by the following equation.

$$Ei' = E + ei \quad (9)$$

The controller 84 is constructed of a known microcomputer, or the like and sequentially controls each component of the printer, and calculates a printing exposure time from the printing exposure amount Ei' to control the shutter driver 76 and open the shutter 73 for a preset time. Instead of calculating the printing exposure time from the printing exposure amount Ei', the printing exposure time may be calculated by adding an exposure correction time obtained from the printing correction amount to a print exposure time obtained in advance from the elementary printing exposure amount.

The operation of the photographic printer system described above will be briefly described with reference to FIG. 17. When the release button 13 of the camera is half depressed, a multi-point distance measuring is performed so that the selector circuit 60 determines the position and distance of the main object within a scene. Thereafter, the taking exposure amount is calculated by using the brightness data at the effective scene divisional areas where the main object is located. When the release button 13 is fully depressed, the focus of the taking lens 33 is adjusted in accordance with the main object distance, and the shutter mechanism 42 is activated in accordance with the taking exposure amount to photograph the scene image. At the time of photographing, various photo-taking information is recorded on the photosensitive emulsion surface of the photographic film at its original frame in the form of bar code, or the like. The photo-taking information includes main object position information, divisional photometry information, taking magnification, aperture, shutter speed, and the like.

After photographing, the photographic film 43 is taken to a laboratory. The photographic film 43 is developed and set in the photographic printer. The photographic film 43 is advanced once from the first frame to the last frame in the photographic printer to read image data and photo-taking information of each frame. The bar code reader 80 reads the bar code 51c recorded for each frame. The read bar code signal is decoded by the decoder 83 into photo-taking information and sent to the controller 84. The photo-taking information includes main object position information, divisional photometry information, taking magnification information, aperture, shutter speed, and the like. The scanner 81 performs three color separation and photometry of each point of a frame and the photometric data is stored in the image memory 85. The controller 84 sends the photometric data in the image memory 85 and various photo-taking information to the printing exposure calculator 86. As described previously, the calculator 86 first calculates the taking exposure control characteristic, and then calculates the shift amount D between the taking exposure control characteristic and ideal taking exposure control characteristic. The print correction amount c·D is calculated by using the shift amount D. Lastly, the elementary printing exposure E is calculated by adding the printing correction amount c·D to the ideal elementary printing exposure amount E0.

After the data recorded on the photographic film 43 has been read, film 43 is transported backward to set the first frame at the printing stage. The frame correcting amount calculator 90 calculates a frame correction amount for each frame. As described previously, this frame correction amount is calculated by primarily taking into account the main object. The printing exposure amount calculator 91 adds the frame correction amount to the elementary printing exposure amount to obtain the final printing exposure amount Ei' for each frame. The controller 84 obtains a shutter open time from the printing exposure amount Ei' to control the shutter driver 76 and print the first frame on the color paper 75. Similarly, the second and following frames are sequentially printed on the color paper 75.

In the above embodiments, photo-taking information is optically recorded on the photosensitive emulsion surface of a photographic film in the form of bar code. However, photo-taking information may be magnetically recorded on a magnetic recording layer of a photographic film having such a layer. The magnetic recording layer may be formed on an area outside of the image recording area, or a magnetic recording layer of transparent magnetic material may be formed over the whole area of the surface opposite to the photosensitive emulsion surface of a film base. Transparent magnetic materials disclosed, for example, in U.S. Pat. Nos. 3,782,947, 4,279,945 and 4,302,523, may be used. Photo-taking information may also be recorded on an electronic recording medium such as an IC memory built in a photographic film cartridge, or an IC card mounted on a camera.

In the above embodiments, the image data of all frames of one roll of photographic film is read to determine the elementary printing exposure amount. However, the elementary printing exposure amount may be determined separately for new and old frames photographed at different days or times providing significant time differences, by referring to photographing date information recorded on new and old frames. In the above embodiment, brightness data of all scene divisional areas and density data of all frame divisional areas are used. Instead, effective scene divisional areas where the main object is considered to be present and the density data of corresponding frame divisional areas only may be used. Furthermore, the elementary printing exposure amount and printing correction amount may be calculated from the density of an area on an original frame such as a particular color (e.g., flesh color) area. The elementary printing exposure amount may be changed in accordance with the camera type and photo-taking information recorded on a film, because the taking exposure control varies with the camera type.

Also in the above embodiments, the grey values are used for the brightness of an object taken with a camera and for the density of a photographic film. Instead, the brightness and density may be calculated for each of three colors R, G, and B by using a camera and photographic printer with a three color separation and photometry function.

Although the present invention has been described with reference to the preferred embodiments shown in the drawings, the invention should not be limited by the embodiments but, on the contrary, various modifications, changes, combinations and the like of the present invention can be effected without departing from the spirit and scope of the invention as defined by the appended claims.

I claim:

1. An automatic control method for a camera having distance measuring means for measuring a scene to be photographed at first to N-th distance measuring points to obtain N distance data, which is representative of a distance to an object located at a corresponding one of said distance measuring points, said camera also having photometry means for measuring said scene at first to M-th scene divisional areas divided from said scene to obtain M brightness data, which is representative of the brightness of an object located in a corresponding one of said scene divisional areas, N and M being integers, said method comprising the steps of:

obtaining distance data $D_i(t-\Delta t)$ for each of said distance measuring points at time point $(t-\Delta t)$, where i represents one of said distance measuring points;

obtaining distance data $D_i(t)$ for each of said distance measuring points at time point which is a point in time after the time period $\Delta t$ has lapsed from time point $(t-\Delta t)$;

obtaining N difference data $\Delta D_i(t)$ for each of said distance measuring points which is the difference between corresponding ones of said two distance data $D_i(t-\Delta t)$ and $D_i(t)$;

comparing the absolute value of each of said N difference data $\Delta D_i(t)$ with a threshold value ThD, and, if said absolute value is greater than said threshold value, judging that an object measured at the corresponding one of said distance measuring points is in motion;

determining at least one effective distance measuring point where a main object is present, said at least one effective distance measuring point including at least one of said measuring points having first distance data corresponding to the smallest distance of said N distance data and a measuring point having distance data falling within a range of a predetermined value $\epsilon$ from said first distance data, respectively among said distance measuring points judged as having an object which is in motion;

obtaining main object distance data from said distance data of said at least one effective distance measuring point;

obtaining main object brightness data from an effective scene divisional area, said effective scene divisional area being said scene divisional area which corresponds to said at least one effective distance measuring point; and automatically focussing a taking lens of said camera in accordance with said main object distance data and automatically controlling exposure control means of said camera in accordance with said main object brightness data for creating an original frame of an image of said scene on a photographic film loaded in said camera.

2. An automatic control method for a camera according to claim 1, said scene divisional areas being defined so as to divide said scene in a matrix configuration, each said distance measuring points being located at a central area of a corresponding one of said scene divisional areas.

3. An automatic control method for a camera according to claim 2, wherein said main object distance data is said first distance data.

4. An automatic control method for a camera according to claim 3, wherein said main object brightness data is an average value of said brightness data corresponding to said effective scene divisional areas.

5. An automatic control method for a camera according to claim 4, further comprising the step of:

automatically zooming said taking lens to a magnification factor nearest to a preset magnification factor within a range where an image of said main object is contained in said original frame, in accordance with the motion amount of said main object as determined in said comparing step, and the position of said main object within said scene as determined in said determining step.

6. An automatic control method for a camera according to claim 4, further comprising the step of:
selecting a mode for discriminating said main object in accordance with a change in said distance data, wherein when said mode is selected, said steps of obtaining said distance data Di(t−Δt) and Di(t) start upon detection of one of a switch activation, a release of said shutter half depression, and a release operation.

7. An automatic control method for a camera according to claim 6, wherein said time Δt, threshold value ThD, and predetermined value ε are predeterminately set to desired values.

8. An automatic control method for a camera having distance measuring means for measuring a scene to be photographed at first to N-th distance measuring points to obtain N distance data, which are representative of a distance to an object of a corresponding one of said distance measuring points, and photometry means for measuring said scene at first to M-th scene divisional areas divided from said scene to obtain M brightness data, which are representative of a brightness of an object in a corresponding one of said scene divisional areas, M and N being integers, said method comprising the steps of:
obtaining brightness data Bi(t−Δt) for each of said scene divisional areas at time point (t−Δt), where i represents one of said scene divisional areas;
obtaining brightness data Bi(t) for each of said scene divisional areas at time point (t) which is a point in time after the time period Δt has lapsed from time point (t−Δt);
obtaining difference data ΔBi(t) for each of said scene divisional areas which is the difference between corresponding ones of said two brightness data Bi(t−Δt) and Bi(t);
comparing the absolute value of each of said M difference data ΔBi(t) with a threshold value ThB, and, if said absolute value is greater than said threshold value, judging that an object measured at the corresponding one of said scene divisional areas is in motion;
obtaining said distance data;
determining at least one effective distance measuring point where a main object is present, said at least one effective distance measuring point including at least one of a measuring point having first distance data corresponding to the smallest distance of said N distance data and a measuring point having distance data falling within a range of a predetermined value ε from said first distance data, respectively among said distance measuring points judged as having an object which is in motion;
obtaining main object distance data from said distance data of said at least one effective distance measuring point;
obtaining main object brightness data from an effective scene divisional area, said effective scene divisional area being at least one of said scene divisional areas and corresponding to said at least one effective distance measuring point; and
automatically focussing a taking lens in accordance with said main object distance data and automatically controlling exposure control means in accordance with said main object brightness data, for creating an original frame of an image of said scene on a photographic film loaded in said camera.

9. An automatic control method for a camera according to claim 8, said M scene divisional areas being defined so as to divide said scene in a matrix configuration, each said N distance measuring points is located at the central area of a corresponding one of said scene divisional areas.

10. An automatic control method for a camera according to claim 9, wherein said main object distance data is said first distance data.

11. An automatic control method for a camera according to claim 10, wherein said main object brightness data is an average value of brightness data of said effective scene divisional areas.

12. An automatic control method for a camera according to claim 11, further comprising the steps of:
zooming said taking lens to a magnification factor nearest to a preset magnification factor within a range where an image of said main object is contained in said original frame, in accordance with the motion amount of said main object as determined in said comparing step, and the position of said main object within said scene as determined in said determining step.

13. An automatic control method for a camera according to claim 11, further comprising the step of;
selecting a mode for discriminating said main object in accordance with a change in said brightness data, when said mode is selected, said step of obtaining said brightness data starts upon detection of one of a switch activation, a shutter half depression, and a change in camera posture, and terminates upon detection of one of a release of said switch activation, a release of said shutter half depression, and a release operation.

14. An automatic control method for a camera according to claim 13, wherein said time Δt, threshold value ThB, and predetermined value ε are predeterminately set to desired values.

15. A camera comprising:
distance measuring means for measuring a scene to be photographed at first to N-th distance measuring points to obtain N distance data which is representative of the distance to an object located at a corresponding one of said distance measuring points, N being an integer;
photometry means for measuring said scene at first to M-th scene divisional areas divided from said scene to obtain M brightness data which is representative of the brightness of an object located in a corresponding one of said scene divisional areas, M being an integer;
means for determining at least one effective distance measuring point where a main object is present, said at least one effective distance measuring point including at least one of said measuring points having first distance data, corresponding to a smallest distance of said distance data, and a measuring point having distance data falling within a range of a predetermined value from said first distance data, respectively among said distance data of said distance measuring points;
means for pre-flashing light before photographing so as to radiate said light toward said scene;
means for obtaining a reflectance of an object present in said effective scene divisional area corresponding to said at least one effective distance measuring point, by measuring a reflectance of said effective scene divisional area while said pre-flashing is accomplished by said pre-flashing means;

means for effecting a comparison between said obtained reflectance and a preset reflectance for said main object and determining a flesh colored area of said main object based on said comparison; and means for controlling a photo-taking exposure in accordance with at least one of said brightness data which corresponds to said flesh colored area of said main subject.

16. A camera according to claim 15, wherein said pre-flashing means is a flash device for illuminating a scene of low brightness.

17. A camera according to claim 16, wherein said pre-flashing means pre-flashes light a plurality of times while incrementally changing the amount of light to be radiated from said flash device, and said photo-taking exposure control means performs a linear prediction of a reflectance in accordance with the relationship between the amount of light radiated during said pre-flashing and the amount of light reflected, and controls said photo-taking exposure and said amount of light to be radiated from said flash device in accordance with the result of said linear prediction.

18. A camera according to claim 16, wherein said pre-flashing means radiates invisible light.

19. A method of producing a photographic print from an original frame recorded on a photographic film, said photographic film having K original frames photographically exposed with a camera, said camera having an automatic focussing function for automatically focussing the taking lens thereof in accordance with a distance to a main object identified from a plurality of distance measuring data obtained at a plurality of distance measuring points by measuring distance to a scene to be photographed, said camera also having an automatic taking exposure control function for automatically controlling a taking exposure amount in accordance with the brightness of one of a plurality of scene divisional areas where said main object is present, said brightness being obtained through divisional photometry of each of said scene divisional areas, said camera also having a photo-taking information recording function for recording, on a recording medium, information relating to said main object position, information of relating to said divisional photometry, and information relating to said taking exposure amount, said method comprising the steps of:

prior to printing said photographic film with a photographic printer, reading said information relating to said main object position, said information relating to said divisional photometry, and said information relating to said taking exposure amount, respectively recorded on said recording medium;

calculating, as a first parameter, a difference between said taking exposure amount and the brightness of each said scene divisional areas contained in said information relating to said divisional photometry;

measuring, as a second parameter, the density of each of a plurality of frame divisional areas of said original frame, each of said frame divisional areas corresponding to one of said scene divisional areas;

retrieving said first and second parameters for each of said K original frames of said photographic film;

obtaining a regression line on a two-dimensional plane constituted by said first and second parameters;

calculating a shift amount in a characteristic between said regression line and a predetermined ideal regression line, in accordance with a weighted average of differences in data between said two regression lines at m sampling points, m being an integer; and correcting a predetermined ideal, elementary printing exposure amount in accordance with said shift amount to determine an elementary printing exposure amount of said photographic film, said original frame being printed on a photographic paper in accordance with said determined elementary printing exposure amount.

20. A method according to claim 19, said scene divisional areas and frame divisional areas being subject to one of grey level photometry and three-color separation photometry, said regression line being formed and said shift amount and elementary scene divisional area brightness being calculated respectively for said grey level and each of said three colors.

21. A method according to claim 19, said first and second parameters being obtained by using data which represents the brightness of said scene divisional area where said main object is present and the density of each corresponding one of frame divisional area.

22. A method according to claim 20, said first and second parameters being obtained by using data which represents the brightness of said scene divisional area where said main object is present and the density of each corresponding one of frame divisional area.

23. A method according to claim 19, said first and second parameters being obtained by using data representing the brightness of specific ones of said frame divisional areas and the density of each corresponding one of said scene divisional areas, each of said specific ones of said frame divisional areas being detected from said original frame as having a flesh color object therein.

24. A method according to claim 20, said first and second parameters being obtained by using data representing the brightness of specific ones of said frame divisional areas and the density of each corresponding one of said scene divisional areas, each of said specific ones of said frame divisional areas being detected from said original frame as having a flesh color object therein.

* * * * *